J. E. THORNTON.
FILM FOR MOTION PICTURES.
APPLICATION FILED NOV. 26, 1912.
1,229,546.
Patented June 12, 1917.
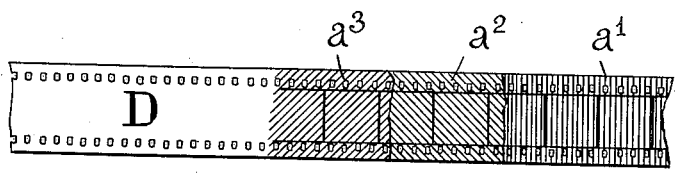
WITNESSES.
INVENTOR.
JOHN EDWARD THORNTON,
By
Waldo G. Morse,
ATTORNEY.

UNITED STATES PATENT OFFICE.

JOHN EDWARD THORNTON, OF ROCHESTER, NEW YORK, ASSIGNOR TO JOHN OWDEN O'BRIEN, OF MANCHESTER, ENGLAND.

FILM FOR MOTION-PICTURES.

1,229,546.

Specification of Letters Patent. Patented June 12, 1917.

Application filed November 26, 1912. Serial No. 733,633.

*To all whom it may concern:*

Be it known that I, JOHN EDWARD THORNTON, a British subject, residing at Rochester, New York, United States of America, have invented certain new and useful Improvements in Films for Motion-Pictures, of which the following is a specification.

This invention relates to the production of a complete three-color-film for cinematograph or motion pictures from which the picture will be projected onto a screen in natural color without the intervention of color screens, and comprises a single film strip upon which successive complete color pictures follow each other in direct sequence.

The invention consists essentially in constructing a film of complete color pictures from two or more (a plurality of) section picture negatives by printing from each of such negatives a single film to obtain section color pictures and after being colored superimposing two or more (a plurality) of such section color films to produce the complete color picture film.

Such a film will possess the following advantages over other motion picture color film systems in which two or more films are employed:—

(1). The film is a single strip of standard width and will therefore fit the regular projecting apparatus used for monochrome films.

(2). The pictures follow in direct sequence, instead of in alternate sequence as in another well-known system. Therefore it only uses half the amount of film that the former process uses, and can be projected at the same speed as monochrome film, instead of requiring double speed, as that does.

(3). It requires no color filters, before the projection lenses or before the film, therefore requires no special projecting apparatus, and passes more light through because there are no screens.

(4). It is also more translucent because the image itself is a colored one, instead of the usual black silver image plus color filters.

The invention will be described with reference to the accompanying drawings.

The drawing represents a fragment of film parts being broken away to show the different layers each having a different color.

By my invention the double or triple quantity of film is avoided, and a single strip used, on which each succeeding image is a complete composite picture in colors in itself, and requires only the same handling in projection as a single monochrome picture.

My invention consists in printing on each of a plurality, three for example, of extremely thin strips of transparent photographic film a series of pictures, the pictures on each film being identical as to the object or position of the object shown with those on the other films except as to color.

The pictures on one film are printed in one of the three primary colors, as green. The next film has its pictures printed in another of the primary colors, as red, and the third strip has the pictures printed in another primary color, as violet.

The strips may be printed by means of any well known three color process, so that only the greens will appear on one, the reds on another, and the violets on the other.

The three strips are now cemented together by means of transparent, water-proof cement. In securing the strips together, the corresponding pictures on each strip must be exactly superimposed.

The pictures when viewed against the light or when projected on the screen of a motion picture device will disclose the natural colors.

The ordinary cinematograph film is about five one thousandths of an inch in thickness and has a layer of emulsion about one one thousandths of an inch thick, thus making a strip of six one thousandths of an inch in thickness. This film is very strong and easily handled and the present day motion picture machines are built to handle such a film.

The individual strips of my multi-layer color film must therefore be not more than .002 of an inch in thickness. They, therefore, consist of a cellulose base of .001 to .0015 of an inch in thickness and a gelatin coating of .0005 of an inch thick, so that when the three are cemented together they will form a film of about the thickness of the commercial film.

What I claim as my invention and desire to protect by Letters Patent is:—

1. A film for motion pictures, consisting of a plurality of layers each containing that portion of a picture represented by a certain color, each layer being colored with a complementary color, the layers being superposed and secured together in proper relation to constitute a complete picture in natural colors.

2. A film for motion pictures, consisting of a plurality of layers, each layer having sections each containing that portion of a picture represented by a certain color, each layer being colored with a complementary color, the layers being superposed and secured together in proper relation to constitute a series of complete pictures in natural colors.

3. A film for moving pictures comprising three layers, each layer containing that portion of a picture represented by a certain color and being colored by a complementary color, the layers being superposed and secured together in proper relation to constitute a complete picture in natural colors, the combined thickness of the film thus produced being less than six one-thousandths of an inch.

In testimony whereof I have hereunto set my hand in presence of two subscribing witnesses.

JOHN EDWARD THORNTON.

Witnesses:
J. OWDEN O'BRIEN,
GEO. H. O'BRIEN.